US010827412B2

(12) United States Patent
Moisio et al.

(10) Patent No.: US 10,827,412 B2
(45) Date of Patent: Nov. 3, 2020

(54) ULTRA-RELIABLE COMMUNICATION RELIABILITY AND DETECTION IN MOBILE NETWORKS

(71) Applicant: Nokia Technologies Oy, Espoo (FI)

(72) Inventors: Martti Johannes Moisio, Klaukkala (FI); Mikko Aleksi Uusitalo, Helsinki (FI); Osman Nuri Can Yilmaz, Espoo (FI); Zexian Li, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/122,247

(22) PCT Filed: Mar. 3, 2014

(86) PCT No.: PCT/US2014/019969
§ 371 (c)(1),
(2) Date: Aug. 29, 2016

(87) PCT Pub. No.: WO2015/133991
PCT Pub. Date: Sep. 11, 2015

(65) Prior Publication Data
US 2016/0374136 A1 Dec. 22, 2016

(51) Int. Cl.
*H04W 40/14* (2009.01)
*H04W 36/30* (2009.01)
(Continued)

(52) U.S. Cl.
CPC ........... *H04W 40/14* (2013.01); *H04L 41/147* (2013.01); *H04L 43/10* (2013.01); *H04L 43/16* (2013.01);
(Continued)

(58) Field of Classification Search
CPC ..... H04W 40/14; H04W 48/20; H04W 36/30; H04W 28/02; H04W 28/0236;
(Continued)

(56) References Cited

U.S. PATENT DOCUMENTS 7,027,409 B2  4/2006  Cain
8,218,523 B2  7/2012  Tao et al.
(Continued)

FOREIGN PATENT DOCUMENTS

WO   WO 2012173544   12/2012

OTHER PUBLICATIONS

International Search Report and Written Opinion received for corresponding Patent Cooperation Treaty Application No. PCT/US2014/019969, dated Nov. 24, 2014, 11 pages.
(Continued)

*Primary Examiner* — Joshua Kading
(74) *Attorney, Agent, or Firm* — Mintz Levin Cohn Ferris Glovsky and Popeo, P.C.

(57) ABSTRACT

Methods and apparatus, including computer program products, are provided for ultra-reliable communications. In one aspect there is provided a method, which may include receiving, by a first user equipment, a reliability estimate for a communication link before the communication link is at least one of used or established between the first user equipment at a first location and a second user equipment at a second location; and at least one of using or establishing the communication link, when the received reliability estimate exceeds a threshold reliability. Related systems, articles of manufacture, and the like are also disclosed.

20 Claims, 6 Drawing Sheets

(51) Int. Cl.
| | |
|---|---|
| H04L 12/26 | (2006.01) |
| H04W 28/02 | (2009.01) |
| H04W 48/20 | (2009.01) |
| H04L 12/24 | (2006.01) |
| H04W 24/02 | (2009.01) |
| H04W 24/10 | (2009.01) |
| H04W 4/70 | (2018.01) |
| H04L 12/801 | (2013.01) |

(52) U.S. Cl.
CPC ......... *H04W 24/02* (2013.01); *H04W 24/10* (2013.01); *H04W 28/0236* (2013.01); *H04W 36/30* (2013.01); *H04W 48/20* (2013.01); *H04L 43/0847* (2013.01); *H04L 43/0852* (2013.01); *H04L 47/11* (2013.01); *H04W 4/70* (2018.02); *H04W 28/02* (2013.01)

(58) Field of Classification Search
CPC ..... H04W 24/02; H04W 24/10; H04W 4/005; H04W 72/08; H04W 74/085; H04W 76/14; H04W 76/15; H04L 41/147; H04L 43/0852; H04L 43/0847; H04L 43/10; H04L 43/16; H04L 47/11
See application file for complete search history.

(56) References Cited

U.S. PATENT DOCUMENTS

| | | | |
|---|---|---|---|
| 8,369,274 B2 | 2/2013 | Sawai | |
| 8,724,539 B2 | 5/2014 | Itagaki et al. | |
| 2010/0124219 A1 | 5/2010 | Brand et al. | |
| 2011/0228666 A1* | 9/2011 | Barbieri | H04W 76/14 370/216 |
| 2012/0184301 A1* | 7/2012 | Jovicic | G01S 5/0081 455/456.5 |
| 2012/0250546 A1 | 10/2012 | Hamida | |
| 2013/0029591 A1* | 1/2013 | Park | H04B 7/026 455/7 |
| 2013/0182584 A1* | 7/2013 | Maguluri | H04W 76/023 370/252 |
| 2014/0122607 A1* | 5/2014 | Fodor | H04W 4/70 709/204 |
| 2016/0269910 A1* | 9/2016 | Lindqvist | H04W 16/04 |

OTHER PUBLICATIONS

Osseiran et al., "The Foundation of the Mobile and Wireless Communications System for 2020 and Beyond Challenges, Enablers and Technology Solutions", Vehicular Technology Conference, 2013, 5 pages.
Yilmaz et al., "Smart Mobility Management for D2d Communications in 5G Networks", IEEE Wireless Communications and Networking Conference Workshops, 2014, pp. 219-223.
"3rd Generation Partnership Project; Technical Specification Group Radio Access Network; Evolved Universal Terrestrial Radio Access (E-UTRA); LTE physical layer; General description(Release 11)", 3GPP TS 36.201, V11.1.0, Dec. 2012, pp. 1-13.
"3rd Generation Partnership Project; Technical Specification Group Radio Access Network; Evolved Universal Terrestrial Radio Access (E-UTRA); Physical channels and modulation(Release 12)", 3GPP TS 36.211, V12.0.0, Dec. 2013, pp. 1-120.
"3rd Generation Partnership Project; Technical Specification Group Radio Access Network; Evolved Universal Terrestrial Radio Access (E-UTRA); Multiplexing and channel coding(Release 12)", 3GPP TS 36.212, V12.0.0, Dec. 2013, pp. 1-88.
"3rd Generation Partnership Project; Technical Specification Group Radio Access Network; Evolved Universal Terrestrial Radio Access (E-UTRA); Physical layer procedures(Release 12)", 3GPP TS 36.213, V12.0.0, Dec. 2013, pp. 1-186.
"3rd Generation Partnership Project; Technical Specification Group Radio Access Network; Evolved Universal Terrestrial Radio Access (E-UTRA); Physical layer; Measurements(Release 11)", 3GPP TS 36.214, V11.1.0, Dec. 2012, pp. 1-14.
Silvo et al., "Ultra-Reliable and Real-Time Communication in Local Wireless Applications", IEEE Industrial Electronics Society, Nov. 10-13, 2013, pp. 5611-5616.
Office action received for corresponding European Patent Application No. 14714453.9, dated Sep. 15, 2017, 6 pages.
Silvo, Joni, et al. "Ultra-reliable and real-time communication in local wireless applications." *Industrial Electronics Society, IECON 2013—39th Annual Conference of the IEEE*. IEEE, 2013.

* cited by examiner

ULTRA-RELIABLE COMMUNICATION RELIABILITY AND DETECTION IN MOBILE NETWORKS

RELATED APPLICATION

This application was originally filed as Patent Cooperation Treaty Application No. PCT/US2014/019969 filed Mar. 3, 2014.

FIELD

The subject matter described herein relates to wireless devices.

BACKGROUND

Reliable communication and, in particular, ultra-reliable communication (URC) may be particularly challenging in some mobile wireless communication systems. URC may be needed in some applications, such as traffic, safety, emergency response, industry, and other areas where reliability concerns are considered by some to be paramount. To that end, the European Union's Mobile and wireless communications Enablers for the Twenty-twenty Information Society (METIS) 5G program is studying URC issues.

SUMMARY

Methods and apparatus, including computer program products, are provided for ultra-reliable communications.

In some example embodiments, there is provided a method, which may include receiving, by a first user equipment, a reliability estimate for a communication link before the communication link is at least one of used or established between the first user equipment at a first location and a second user equipment at a second location; and at least one of using or establishing the communication link, when the received reliability estimate exceeds a threshold reliability.

In some variations, one or more of the features disclosed herein including the following features can optionally be included in any feasible combination. The communication link may include an ultra-reliable communication link. An indication of a transmission format may be received to enable the reliability estimate to exceed the threshold reliability. The reliability estimate may be received in response to sending a request to a network. The reliability estimate may include at least one of an indicator of an expected reliability of the ultra-reliable communication link or a measurement information representative of the expected reliability of the ultra-reliable communication. The reliability estimate may be determined based on one or more measurements performed, before the establishing of the ultra-reliable communication link, by one or more nodes in the same or adjacent location as the first user equipment. The first user equipment may receive a request from the network to send one or more probes to enable one or more measurements of the communication link before the ultra-reliable communication link is at least one of used or established between the first user equipment and the second user equipment. One or more measurement results for the ultra-reliable communication link may be reported to the network before the ultra-reliable communication link is at least one of used or established between the first user equipment and the second user equipment. The reported one or more measurements may include location information and at least one of a timestamp or an expiration.

In some example embodiments, there is provided a method, which may include receiving, from a first user equipment, a request for a reliability estimate for a communication link between the first user equipment at a first location and a second user equipment at a second location, wherein the request is received before the communication link is at least one of used or established between the first user equipment and the second user equipment; and sending, before the communication link is at least one of used or established between the first user equipment and the second user equipment, the reliability estimate for the ultra-reliable communication link.

In some variations, one or more of the features disclosed herein including the following features can optionally be included in any feasible combination. The communication link may include an ultra-reliable communication link. One or more nodes may be requested to provide reliability information at the first location and/or the second location. The reliability information measured at the first location and/or the second location may be received from the one or more nodes in response to the requesting. The reliability information may further include at least one timestamp indicating an age of the reliability information. The reliability estimate for the ultra-reliable communication link at the first location and/or the second location may be determined based on the received information. The one or more nodes may include the first user equipment and/or the second user equipment.

In some example embodiments, there is provided a method, which may include requesting one or more nodes to provide reliability information at the first location and/or the second location; receiving, from the one or more nodes in response to the requesting, the reliability information measured at the first location and/or the second location; and determining, based on at least the received reliability information, a reliability estimate of a proposed communication link at the first location and/or the second location.

In some variations, one or more of the features disclosed herein including the following features can optionally be included in any feasible combination. The proposed communication link may include a proposed ultra-reliable communication link. The reliability estimate may include at least one of an indicator of an expected reliability of the proposed ultra-reliable communication link or a measurement information representative of the expected reliability of the proposed ultra-reliable communication. The reliability estimate may be sent before at least one of an establishment or a use of proposed ultra-reliable communication.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

DESCRIPTION OF THE DRAWINGS

In the drawings.

Like labels are used to refer to same or similar items in the drawings.

DETAILED DESCRIPTION

In the case of ultra-reliable communications (URC), the required error-free reliability may be relatively high (for example, about 99.999%, although other reliabilities may be used as well). Reliability, in the case of packet transmission, may be defined as a probability (or a likelihood) that a packet is delivered error-free from a source to a target within a certain time window or by a certain deadline, although reliability may be measured in other ways as well. In addition to reliability, URC-capable wireless devices may need to be able to detect if URC transmission is available (at, for example, a predetermined reliability) for use at a given location and/or given time. In some example embodiments, the subject matter disclosed herein may provide mechanisms to detect whether URC transmission is available for use and, in particular, URC availability in applications, such as car-to-car communications related to traffic safety (as well as other applications where reliability, delay and/or packet loss requirements are relatively stringent or applications needing knowledge about URC at a given time or given location).

In some example embodiments, one or more transmissions, such as probes, test packets, and the like, may be used to evaluate the reliability of URC communication in advance of actual URC communications. In some example embodiments, nodes (which may not be participating in the actual URC communication) may be used to evaluate the expected reliability of URC links. The reliability information, such as latency, packet error rate, data rate, and the like, may provide an indication of the reliability and thus availability of URC communications at a given location and/or given time. For example, reliability information (indicative of a reliability below a threshold at a given location) may indicate that URC communication is not available at the location.

In some example embodiments, the reliability information may be gathered by one or more nodes, and reported to for example a central node, such as a network node, although other node(s) may act as a central node as well. The reliability information may be stored in for example a database, which can then be subsequently accessed to estimate the URC communications link reliability before the actual URC event (for example, establishment of an actual URC link). The reliability information may be specific to a location and may take into account frequency and/or time as well. For example, the stored reliability information may be for a specific location as well as radio frequency and/or time (for example, different times of day, such as rush hour, evening, and other times as well). Moreover, the data may include a timestamp (or other indicator of age) and/or expiration indicator, to enable stale data to be processes accordingly. For example, aged reliability information for a given location may be ignored or weighted so that it less relevant than more recent data. For example, the validity of stored reliability information may be weighted with a weighting function dependent on age of the measurement, as well as other factors (as the aging of information might depend on other factors as well, such as location).

Based on the stored URC reliability information, the availability of URC communication may be estimated before the establishment of a URC communications link. For example, if there is a low probability for establishing a URC link based on the stored reliability information, one or more affected nodes may be informed beforehand that URC communication link establishment is not possible. However, if there is a good probability for establishing a URC link based on the stored reliability information, one or more affected nodes may be informed beforehand that URC communication link establishment is possible.

Moreover, when it is determined that URC communications is available, in some example embodiments, a determination of candidate parameters for reliable URC communication may also be determined and/or provided. For example, the reliability information may be indicate that URC may be available if a certain modulation, coding, frequency channel, antenna diversity, and/or other transmission format factors are used for the URC. However, if the transmission format fails to make URC communication available, the transmission parameters may be varied to improve the likelihood of URC communication availability. Moreover, other sources of interference (for example, other co-channel nodes) or noise (for example, in device co-existence) may be muted for the duration of the transmission, if the main interferer can be identified. For example, if a source of interference is be identified, reliability may be improved by silencing that source of interference (for example, via muting of the interferer for the time of URC transmission).

Figure 1:
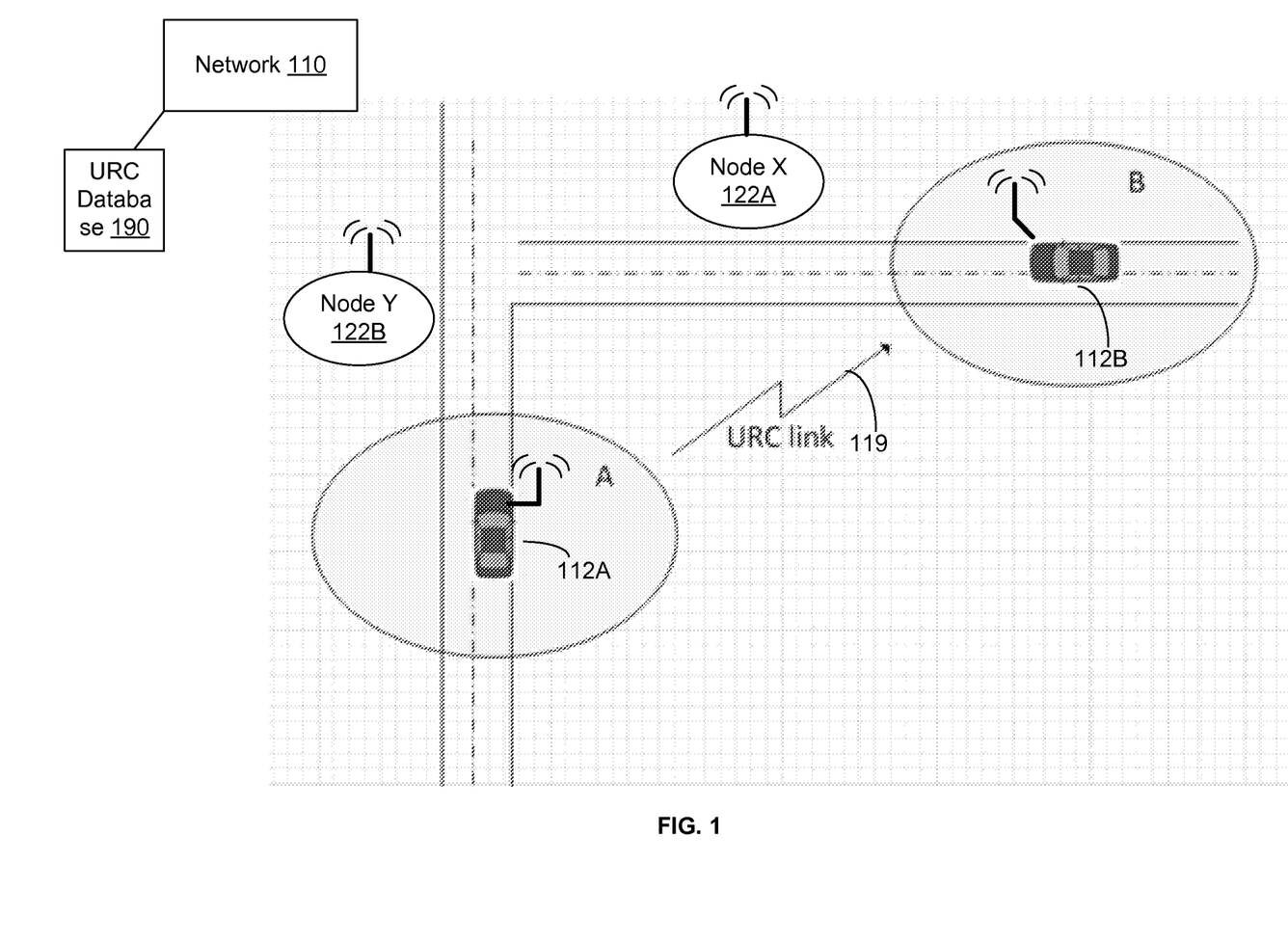
FIG. 1 depicts an example of a system for ultra-reliable communications, in accordance with some example embodiments.

FIG. 1 depicts an example system 100 including a vehicle including a transmitter 112A at a first position A and another vehicle including a receiver 112B at a second position B.

Before establishing or attempting to use a URC link 119 between wireless devices 112A-B, reliability information including URC communication channel quality measurements may be performed, and the measurements may be based on measurements made by other neighboring nodes that are also in the vicinity of positions A and/or B. For example, before establishing URC link 119, transmitter 112A may access network 110 including URC database 190 to obtain reliability information. This reliability information may be provided by other similarly located nodes, such as node Y 122B, node X 122A, and the like. Alternatively or additionally, transmitter 112A may access similarly located nodes, such as node Y 122B, node X 122A, and the like, to obtain reliability information and/or an estimate of the URC link 119 reliability. Nodes 122A-B may be implemented at other vehicles, mobile sensors, fixed sensors, cell phones, and/or any other wireless device including a URC transceiver, and nodes 122A-B may be used to measure, collect, and/or determine URC reliability information estimation.

The URC reliability estimate for a given URC link 119 may indicate that the reliability may be at or above a predetermined threshold (for example, 99.999% reliability, although other reliability values may be used). If the reliability estimate is below the predetermined threshold, then URC is not available at a given location, but if the reliability estimate is at or above the predetermined threshold, then URC is available at a given location.

The URC reliability estimate may be performed as part of on-going communications with other nodes. For example, when a node, such as node 122A communicates with another node, such as node 122B, communication link or quality measures typically made with respect to a given channel may also be used to assess the channel for possible URC communications. When there are moving nodes (for example, in vehicles, such as cars), there may be a plurality of node pairs (for example, nodes 112A, 112B and the like) at the same position but at different times because on for example roads mobility is limited to certain trajectories, so the plurality of node pairs may be candidates for providing reliability measurements (either as part of ongoing transmission or by using special probe signals). Moreover, the measurements and/or assessments may be collected at one or more nodes (and/or in the network 110 and/or database 190) to enable an estimate of the reliability of a possible URC link. Alternatively or additionally, one or more nodes, such as nodes 122A-B and/or any other node, may send one or more probe signals to specifically test the possibility of setting up a URC communication link at a given channel and location being considered to carry URC link 119. In some example embodiments, the probe signal may implement the same or similar transmission formats (for example, modulation and coding scheme and the like) as an actual URC transmission signal 119, although the probe may take different forms as well.

Based on the reliability information, network 110, transmitter 112A, and/or any other node may determine (for example, estimate) the reliability a URC link 119 before the link 119 is established between position A and B. If the determined reliability estimate for the URC link is sufficient (for example, at or above a predetermined threshold of URC), the transmitter 112A may proceed with URC link establishment and/or use. However, if the determined reliability estimate for the URC link is insufficient (for example, below the predetermined threshold of URC), the transmitter 112A may inhibit URC link establishment or use and/or vary the parameters of the transmission format for link 119 being considered and re-run the reliability estimate to assess the revised URC reliability for the proposed URC link 119. The predetermined threshold may be 99.999% reliability, although other values enabling reliable communications may be used as well. This process may be iterated one or more times, although iteration may not occur as well.

The URC reliability estimate for a given URC link at a given location may include collecting packet/bit error rates statistics and/or packet delay statistics (including information regarding retransmissions) from one or more nodes. These statistics (which may be indicative of the URC reliability) may be stored in for example one or more nodes, the network, and/or database. In addition, the background interference levels at a given location may also be collected and stored in for example one or more nodes, the network, and/or database. This stored information may then be used to provide a URC reliability estimate function, $R(U, t, f, I, \bar{p})$, which may be a function of one or more of the following: a transmission format U (including relevant details, such as modulation and coding scheme, transmit power and the like); time t; frequency f; background interference I; and position vector $\bar{p}$ (between communicating nodes which may include an absolute position/location of communicating pair 112A-B); and/or other parameters as well. For example, the speed of a node collecting the information used for the URC reliability estimate may be used, as well as time of day, and the like. In some example embodiments, a plurality of nodes may participate to update the stored reliability information, given there can be constraints like other transmissions, energy efficiency, and the like. In the case of the reliability function, the transmission format, U, may affect reliability as well as required signal to noise (while transmit power indicates whether there is a need to increase the signal to noise above a given threshold for reliable communications); time, t, relates to an amount of other expected traffic (for example, due to rush hour or another time when traffic patterns may vary), conditions of congestion and propagation characteristics can also be very different depending on time as well as the frequency, f); interference, I, may also strongly influence signal to noise (and thus reliability); and position vector $\bar{p}$ (as well as other parameters) may vary based on a given location/position.

In addition to the communication channel quality information provided by the neighboring nodes 122A-B, the URC reliability estimate may take into account any additional available channel estimation information/link measurements between the transmitter 112A at positions A and receiver 112B at position B. Although neighboring nodes 122A-B may be used to provide a communication channel quality, the URC link 119 reliability estimation may not be determined well in advance, when the communicating nodes 112A-B are not yet in their final positions. If the nodes are moving, the estimate provided by their measurements may be most useful when the measurements have reached the most representative positions with respect to the positions of interest for the measurement. For example, if an estimate concerning position x is needed, it may not be so useful to perform a measurement at another position y.

To illustrate further, the two vehicles at FIG. 1 may be for example approaching an intersection. The URC link 119 may be used as for example a car-to-car communication link, such as a device-to-device link between transmitter 112A and receiver 112B. For example, URC link 119 may be used as a collision warning communication link to warn the vehicle containing transmitter B 112B of an impending collision. The URC link may be used for other purposes as well including V2V (vehicle-2-vehicle), V2I (vehicle-to-infrastructure), vehicle-to-road-side-sensor, and/or any other application which may implement URC.

In some example embodiments before the actual URC link 119 transmission or establishment, transmitter 112A may obtain information from the network 110 including database 190, and this information may indicate the reliability of the proposed URC link 119 (for example, how reliable the URC link 119 may be if established). If transmitter 112A expects to transmit at time $t0+\Delta T$ (wherein the current time is $t0$, and $\Delta T$ is a time when the URC transmission 119 is expected), transmitter 112A may consult database 190 (for example, to obtain reliability information for link 119 and/or an indication of the reliability estimate of link 119) beforehand at time $t0$ to find the best possible match for the given transmission format parameters (for example, frequency, interference, position vector/location, and/or the like). If there is a sufficient match, the reliability estimate R may be used to decide whether URC transmission 119 should proceed at time $t0+\Delta T$. The URC reliability estimate R may then be used to decide whether URC transmission 119 should proceed at time $t0+\Delta T$. If there is not a sufficient match, the network/database may indicate this and/or provide an alternative set of transmission format parameters for a given position/location. The nodes which need URC communication may obtain the information from the network in advance in order to perform the reliability determination, and the information may be updated (for example, from time to time or based on location changes indicated by for example a global positioning system and the like). This may enable the network to prepare the URC transmission 119 event beforehand, and enable non-participating nodes to perform URC probe measurements to allow a determination of the reliability estimate.

Although FIG. 1 depicts an example of URC link for use with vehicles, the URC link(s) may be used in stationary frameworks as well as frameworks not including vehicles. For example, the transmitter 112A and receiver 112B may be used in other frameworks, such as industrial applications where URC may be required.

Figure 2:
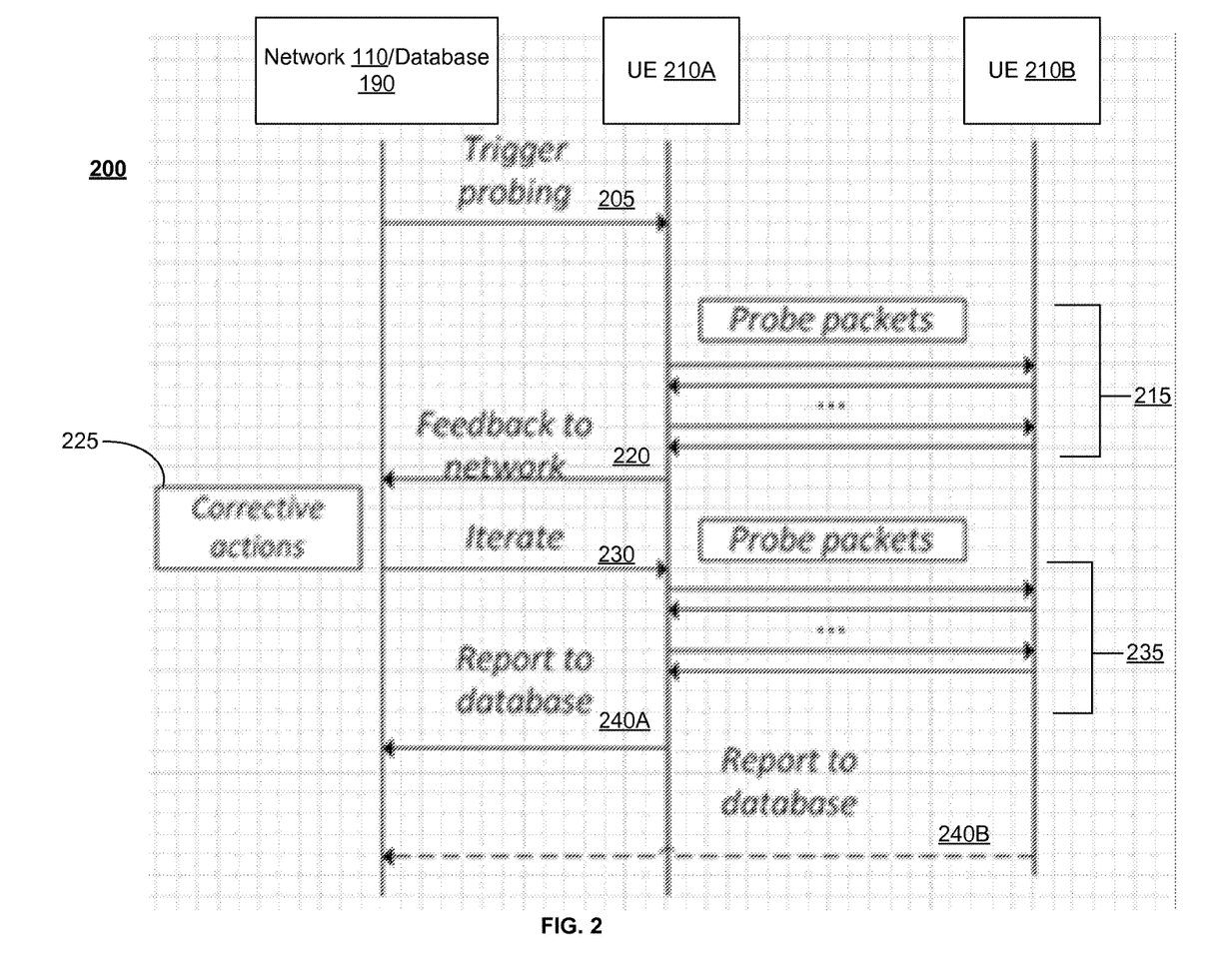
FIG. 2 depicts an example of a process for collecting reliability information for ultra-reliable communications, in accordance with some example embodiments.

FIG. 2 depicts a process 200 for estimating URC link reliability, in accordance with some example embodiments. Process 200 depicts user equipment 210A-210B sending probing packets and reporting quality information to the network including a database. User equipment 210A-B may be implemented as nodes 122A-B that are not participating in URC link 119, although in some example embodiments user equipment 210A-B may participate in the URC link 119 as well.

At 205, a trigger may be sent to initiate a probe, in accordance with some example embodiments. For example, network 110, such as a wireless access point, a base station, and/or any other node, may send an indication to user equipment 210A to trigger probing by user equipment 210A. This trigger 205 may be sent as a message, a page, a broadcast, and/or in other ways as well.

At 215, one or more probes may be sent in response to the trigger 205, in accordance with some example embodiments. For example, when user equipment 210A receives trigger 205, user equipment 210A may start testing one or more candidate URC links by sending one or more probe signals, one or more probe packets, and/or any other type of probe to other wireless nodes, such as user equipment 210B. In the example of FIG. 2, user equipment 215A may send a probe packet to user equipment 215B, which responds with a measurement, such as ACK/NACK or signal-to-noise ratio of the received probe packet. User equipment 215B may, however, also send probe packets as well. The probes may be sent on one or more different frequencies, using one or more modulation and coding schemes, and the like. Moreover, the probe may have the same or different transmission format from the URC link 119 being considered for establishment/use. For example, user equipment 210A-B may be providing estimates to be considered for the proposed URC link 119 between transmitter 112A and receiver 112B.

At 220, the link quality of one or more candidate URC links may be reported to the network, in accordance with some example embodiments. For example, measurements on the probes 215 and/or any other link measurement information may be reported to network 110. The reported information may be stored at for example database 190 as URC link reliability information. Moreover, the reported information may be used to estimate URC reliability. The reported URC link quality information may also include information to allow a determination/estimation of reliability of a higher-layer, such as layer 3 or other layers. For example, quality may be measured on one or more layers in the communication stack. In the case of LTE, the measurements may take into account radio link control, media access control, layer 3, and/or the packet data convergence protocol layers to provide indication regarding the performance of, for example, some (if not all of) the protocol stack including for example possible retransmissions by a layer).

If the estimated URC reliability estimate is not sufficient, the network may take corrective actions, at 225, in accordance with some example embodiments. For example, a node, such as network 110 and the like, may estimate the reliability of a candidate URC link, such as link 119. The estimate may be based on the information reported at 220.

If the determined reliability is sufficient (for example, above a required threshold of reliability), then the network may provide either the estimate or an indication that the candidate URC link 119 at a given location may be reliably established. If the determined reliability is insufficient (for example, below a required threshold of reliability), then the network may re-allocate spectrum, propose alternative transmission format parameters, propose additional transmission power (if needed), and/or other parameters that might make the communication link more robust. These corrective actions may have a deadline by which the actions should be performed (or within certain time window) before the actual URC communication occurs.

After the corrective action at 225, the network may at 230 request additional probing, which occurs at 235, in accordance with some example embodiments. This additional probing at 235 may be performed directly between the user equipment 210A-B, although other nodes may be used as well. Moreover, the probing at 235 may use the same or different transmission formats, retransmission protocols, frequencies, modulation and coding schemes, and the like.

At 240A-B, user equipment 210A-B may again report reliability information (for example, quality measurement and the like) of the probing to network 110, in accordance with some example embodiments.

Although FIG. 2 describes the network 110 triggering probing, collecting the reliability measurement, and the like, any other node may perform these operations as well.

In some example embodiments, the URL reliability estimate may also take into account the behavior of a given transceiver as transceiver performance can vary across different devices.

Figure 3:
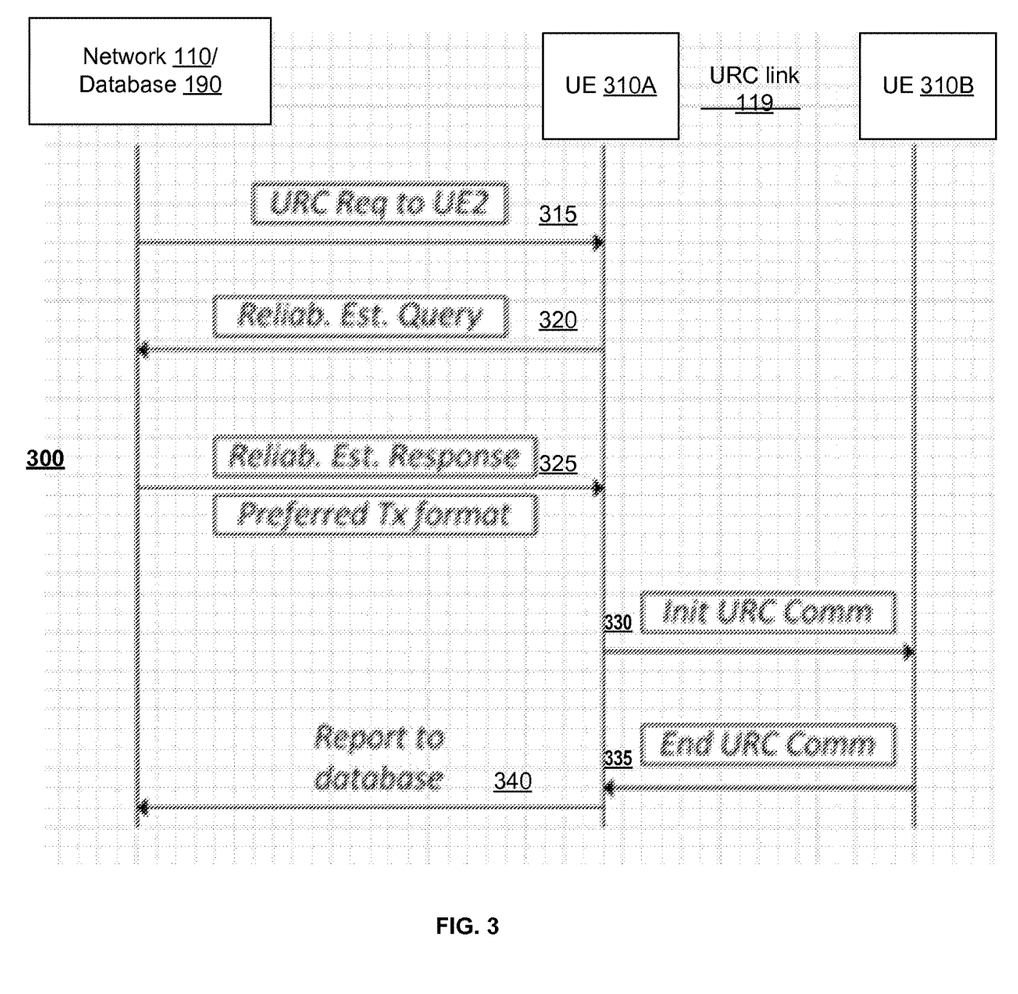
FIG. 3 depicts an example process for ultra-reliable communications, in accordance with some example embodiments.

FIG. 3 depicts another example process 300 estimating URC link reliability, in accordance with some example embodiments. Process 300 depicts user equipment 310A-310B participating in a URC link, although user equipment 310A-B may be configured to not participate as well.

At 315, network 110 may send an indication to user equipment 310A to request that a URC communication link, such as URC link 119, should be established to another node, such as user equipment 310B. A user equipment's position/location may trigger indication 315. For example, if the user equipment is approaching an intersection or triggers a sensor, a message, such as "URC Req," may be sent to a user equipment.

In response to 315, user equipment 310A may request, at 320, from the network/database 190 reliability estimate information for the URC communication link. At 325, the network 110 may respond with the reliability estimate information and/or an indication of the reliability estimate for a URC link to be established between user equipment 310A-B. Moreover, the response may also indicate a given transmission format, such as modulation, coding, antenna diversity, frequency, and/or other aspects of the transmission.

After receiving the response at 325, the user equipment 310A may perform testing of proposed URC transmission link 119 before the actual critical URC communication transmission occurs at 330. This testing may include probe packets, which can be used to further measure the quality of the channel that will carry URC link 119 and thus assess reliability of URC link 119. However, user equipment 310A may not perform testing and proceed to establish and/or transmit via URC link 119 to user equipment E 310B at 330. When link is no longer needed, it may be terminated as indicated at 335. User equipment 310A-B may also report back any quality measurements at 340 to network 110, which can be stored as URC reliability information at database 190 for subsequent use in determining URC link reliability.

In some example embodiments, the transmission characteristics of the probe signals and/or the radio environment may be changed iteratively until a certain URC link reliability attained. After this URC link reliability is attained, the system may freeze the situation by for example not allowing any interfering links to the area for a certain time.

Figure 4:
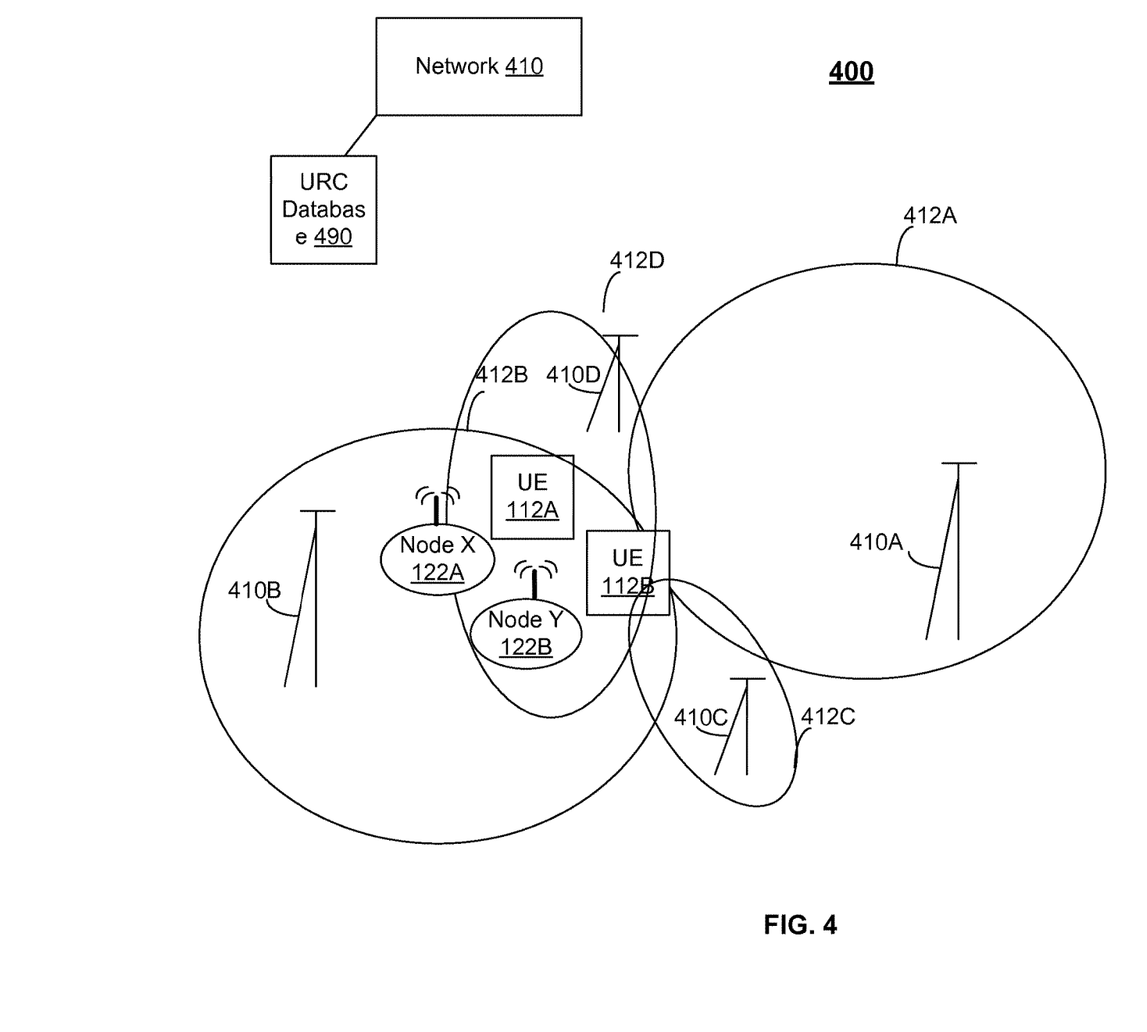
FIG. 4 depicts an example system in which ultra-reliable communications may be practiced, in accordance with some example embodiments.

FIG. 4 depicts a system 400 including a plurality of wireless access points 410A-D serving cells 412A-D, in which one or more nodes may be located, in accordance with some example embodiments.

In some example embodiments, the nodes may be implemented as nodes 122A-B and user equipment 112A-B depicted at FIG. 1. The nodes be referred to as, for example, user equipment, transceivers, mobile stations, mobile units, subscriber stations, wireless terminals, tablets, smart phones, sensors, wireless devices, devices, and/or the like. In some example embodiments, nodes 122A-B and user equipment 112A-B may be configured to provide URC communications. Moreover, one or more of the nodes may be configured to operate using a plurality of radio access technologies including one or more of the following: Long Term Evolution (LTE), wireless local area network (WLAN) technology, such as 802.11 WiFi and the like, Bluetooth, Bluetooth low energy (BT-LE), near field communications (NFC), and/or any other radio access technologies.

One or more of wireless access points 410A-D may, in some example embodiments, be implemented as an evolved Node B (eNB) type base station, although other types of radio access points may be implemented as well. One or more of wireless access points 410A-D may also be configured to serve cells using a WLAN technology, such as WiFi (for example, the IEEE 802.11 series of standards), as well as any other radio access technology capable of serving a cell. When the evolved Node B (eNB) type base station is used, the base station may be configured in accordance with standards, including the Long Term Evolution (LTE) standards, such as 3GPP TS 36.201, Evolved Universal Terrestrial Radio Access (E-UTRA); Long Term Evolution (LTE) physical layer; General description, 3GPP TS 36.211, Evolved Universal Terrestrial Radio Access (E-UTRA); Physical channels and modulation, 3GPP TS 36.212, Evolved Universal Terrestrial Radio Access (E-UTRA); Multiplexing and channel coding, 3GPP TS 36.213, Evolved Universal Terrestrial Radio Access (E-UTRA); Physical layer procedures, 3GPP TS 36.214, Evolved Universal Terrestrial Radio Access (E-UTRA); Physical layer—Measurements, and any subsequent additions or revisions to these and other 3GPP series of standards (collectively referred to as LTE standards). Wireless access points 410A-D may have wired and/or wireless backhaul links to other networks and/or network nodes including a core network, a network management entity, and the like.

Although FIG. 4 depicts a certain quantity, type, and configuration of devices, other quantities, types, and configurations may be implemented as well. For example, other quantities and configurations of wireless access points, base stations, cells, and user equipment may be implemented as well.

Figure 5:
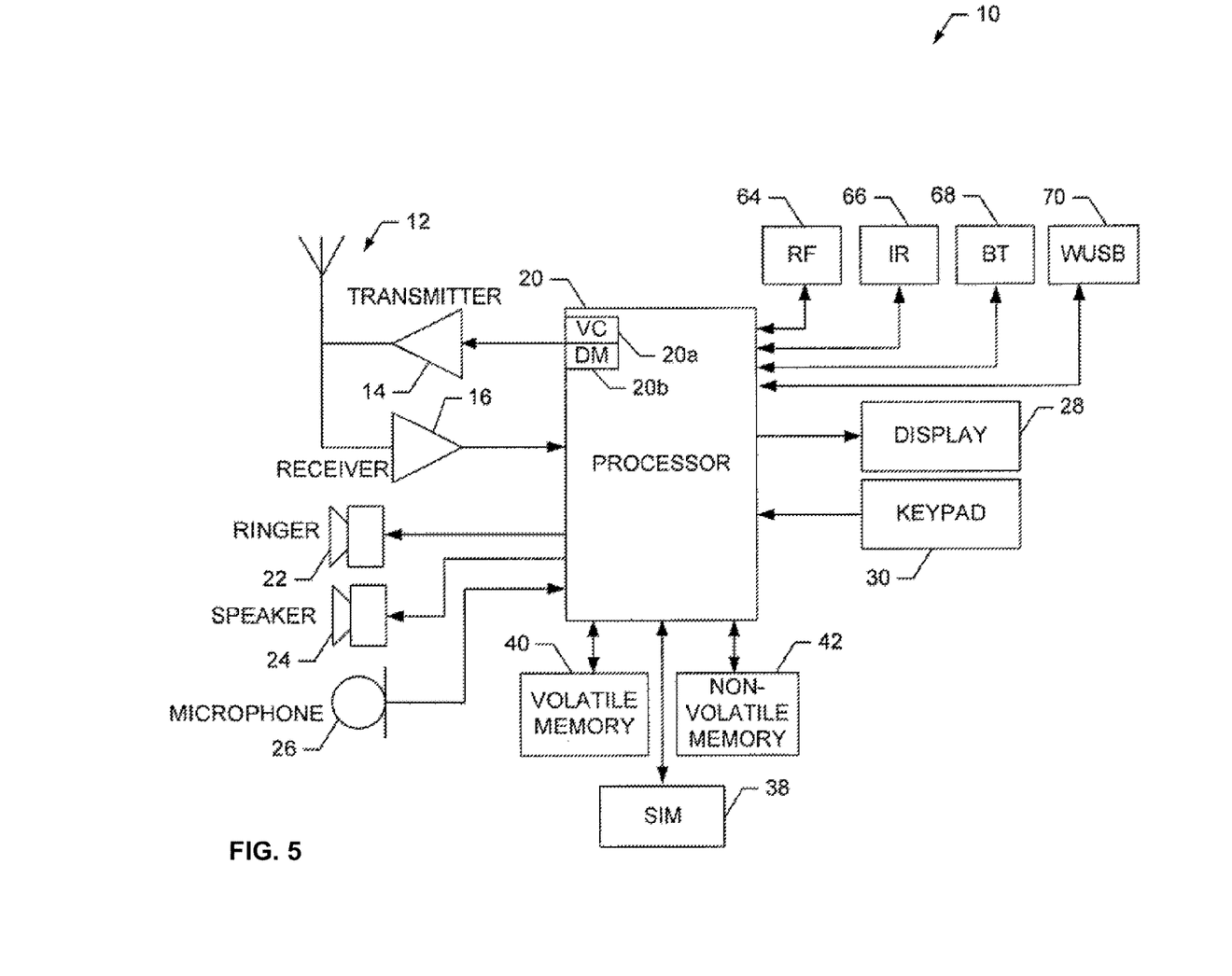
FIG. 5 depicts an example of a user equipment, in accordance with some example embodiments.

FIG. 5 illustrates a block diagram of an apparatus 10, in accordance with some example embodiments. For example, apparatus 10 may be implemented at one or more of nodes 122A-B and/or user equipment 112A-B.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 5 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 5, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), a eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the user equipment/mobile terminal. The memories may comprise an identifier, such as an international mobile equipment identification (IMEI) code, capable of uniquely identifying apparatus 10. The functions may include one or more of the user equipment/node operations disclosed with respect to process 200, 300 and/or the like. The memories may comprise an identifier, such as an international mobile equipment identification (IMEI) code, capable of uniquely identifying apparatus 10. In the example embodiment, the processor 20 may be configured using computer code stored at memory 40 and/or 42 to receive a reliability estimate for an ultra-reliable communication link before the ultra-reliable communication link is at least one of used or established between the first user equipment at a first location and second user equipment at a second location, establish the ultra-reliable communication link, when the received reliability estimate exceeds a threshold reliability; send probes; collect and/or report quality measurements, and any other operation disclosed herein.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 5, computer-readable medium may comprise a non-transitory computer-readable storage medium that may be any media that can contain or store the instructions for use by or in connection with an instruction execution system, apparatus, or device, such as a computer.

Figure 6:
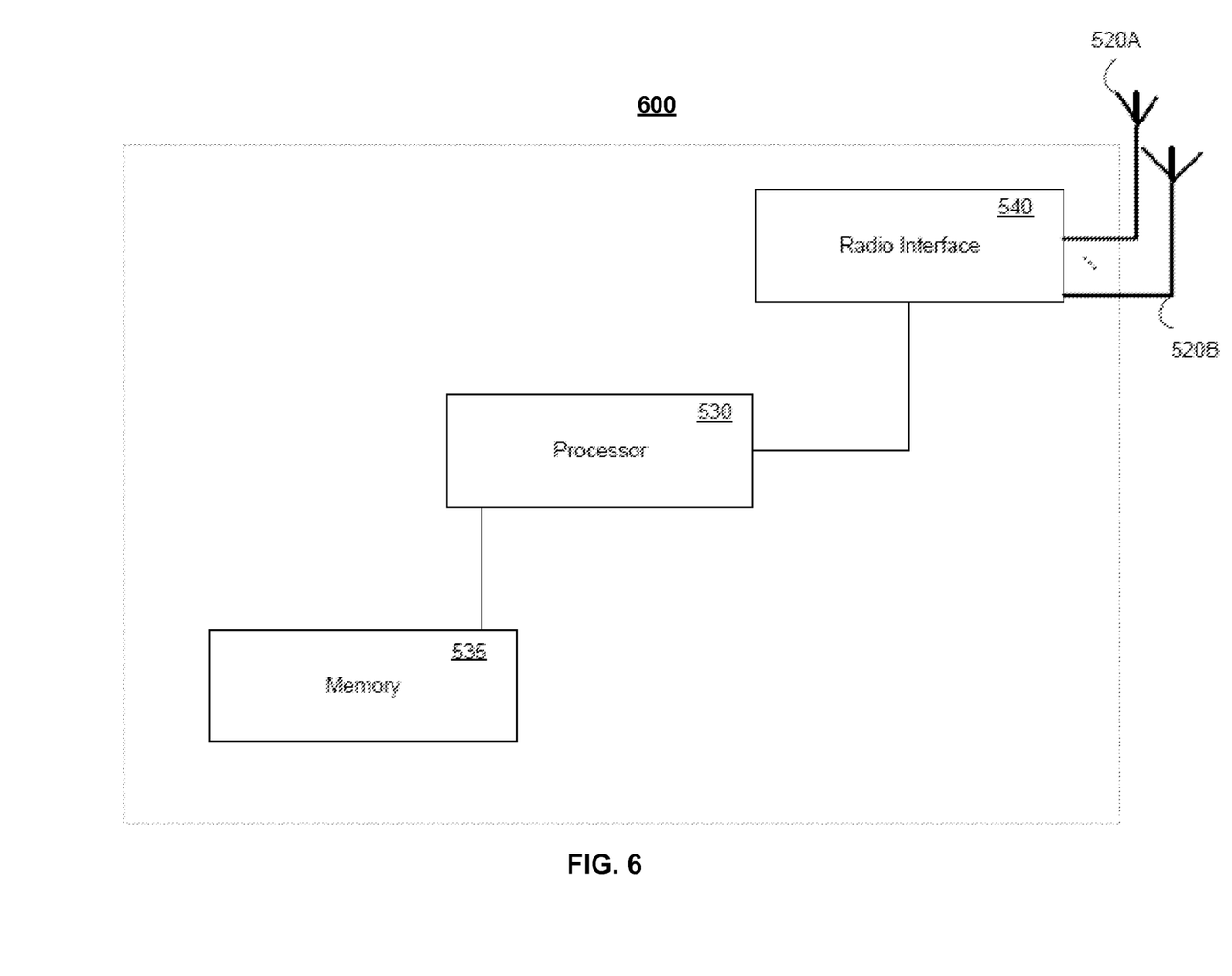
FIG. 6 depicts an example of a wireless access point, in accordance with some example embodiments.

FIG. 6 depicts an example implementation of a wireless access point 500, which may be implemented at for example network 100 and/or wireless access points 410A-D, in accordance with some example embodiments. The wireless access point 500 may include one or more backhaul links to for example database 190. The wireless access point may include one or more antennas 520 configured to transmit via downlinks and configured to receive uplinks via the antenna(s) 520. The wireless access point may further include a plurality of radio interfaces 540 coupled to the antenna(s) 520. The radio interfaces 540 may correspond to a plurality of radio access technologies including one or more of LTE, WLAN, Bluetooth, Bluetooth low energy, NFC, radio frequency identifier (RFID), ultrawideband (UWB), ZigBee, ANT, and the like. The radio interface 540 may include components, such as filters, converters (for example, digital-to-analog converters and the like), mappers, a Fast Fourier Transform (FFT) module, and the like, to generate symbols for a transmission via one or more downlinks and to receive symbols (for example, via an uplink). The wireless access point may further include one or more processors, such as processor 530, for controlling the wireless access point 500 and for accessing and executing program code stored in memory 535. In some example embodiments, the memory 535 includes code, which when executed by at least one processor, causes one or more of the operations described herein with respect to a network node, the network, and the like. For example, the wireless access point 500 may be configured to trigger measurements in a node, collect quality measurements, estimate URC reliability, provide an indication of URC reliability, and/or any other operation disclosed herein.

Without in any way limiting the scope, interpretation, or application of the claims appearing below, a technical effect of one or more of the example embodiments disclosed herein is estimating URC link reliability prior to use to increase the likelihood of a successful URC transmission.

If desired, the different functions discussed herein may be performed in a different order and/or concurrently with each other. Furthermore, if desired, one or more of the above-described functions may be optional or may be combined. Although various aspects of the subject matter disclosed herein are set out in the independent claims, other aspects of the subject matter disclosed herein comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the present subject matter disclosed herein as defined in the appended claims. Other embodiments may be within the scope of the following claims. The term "based on" includes "based on at least." The use of the phase "such as" means "such as for example" unless otherwise indicated.

What is claimed is:

1. A method comprising:
    sending, from a first user equipment and to a network node, a request for a reliability estimate for a communication link before the communication link is at least one of used or established between the first user equipment at a first location and a second user equipment at a second location;
    receiving, by the first user equipment and from the network node in response to the request from the first user equipment, the reliability estimate for the communication link, the reliability estimate being based on collected and stored transmission information from a plurality of nodes, the plurality of nodes including at least a first node and a second node that are each neighboring nodes of at least one of the first user equipment and the second user equipment, the transmission information including at least packet statistic information indicative of a reliability of the communication link; and
    at least one of using or establishing, by the first user equipment, the communication link, the at least one of using or establishing being based on a determination by the first user equipment that the received reliability estimate exceeds a threshold reliability, wherein the threshold reliability is indicative of a defined reliability for the communication link.

2. The method of claim 1, wherein the communication link comprises an ultra-reliable communication link.

3. The method of claim 2, wherein the reliability estimate comprises at least one of an indicator of an expected reliability of the ultra-reliable communication link or a measurement information representative of the expected reliability of the ultra-reliable communication link.

4. The method of claim 2, wherein the reliability estimate is determined based on one or more measurements performed, before the establishing of the ultra-reliable communication link, by the plurality of nodes.

5. The method of claim 2, further comprising:
    reporting, by the first user equipment to the network node, one or more measurement results for the ultra-reliable communication link before the ultra-reliable communication link is at least one of used or established between the first user equipment and the second user equipment.

6. The method of claim 5, wherein the reported one or more measurements include location information and at least one of a timestamp or an expiration indicator.

7. The method of claim 1, wherein the receiving further comprises:
    receiving, by the first user equipment and from the network node, an indication of a transmission format to enable the reliability estimate to exceed the threshold reliability.

8. An apparatus, comprising:
    at least one processor; and
    at least one memory including computer program code, the at least one memory and the computer program code configured to, with the at least one processor, cause the apparatus to at least:
        send, from the apparatus and to a network node, a request for a reliability estimate for a communication link before the communication link is at least one of used or established between the apparatus at a first location and a first user equipment at a second location;
        receive, by the apparatus from the network node in response to the request from the apparatus, the reliability estimate for the communication link, the reliability estimate being based on collected transmission information from a plurality of nodes, the plurality of nodes including at least a first node and a second node that are each neighboring nodes of at least one of the apparatus and the first user equipment, the transmission information including at least packet statistic information indicative of a reliability of the communication link; and at least one of use or establish the communication link, the at least one of use or establish being based on a determination by the apparatus that the received reliability estimate exceeds a threshold reliability, wherein the threshold reliability is indicative of a defined reliability for the communication link.

9. The apparatus of claim 8, wherein the communication link comprises an ultra-reliable communication link.

10. The apparatus of claim 9, wherein the reliability estimate comprises at least one of an indicator of an expected reliability of the ultra-reliable communication link or a measurement information representative of the expected reliability of the ultra-reliable communication.

11. The apparatus of claim 9, wherein the reliability estimate is determined based on one or more measurements performed, before the establishing of the ultra-reliable communication link, by the plurality of nodes.

12. The apparatus of claim 9, wherein the apparatus is further configured to at least receive a request from the network node to send one or more probes to enable one or more measurements of the ultra-reliable communication link before the ultra-reliable communication link is at least one of used or established between the apparatus and the first user equipment.

13. The apparatus of claim 9, wherein the apparatus is further configured to at least report to the network node one or more measurement results for the ultra-reliable communication link before the ultra-reliable communication link is at least one of used or established between the apparatus and the first user equipment.

14. The apparatus of claim 13, wherein the reported one or more measurements include location information and at least one of a timestamp or an expiration indicator.

15. The apparatus of claim 8, wherein the apparatus is further configured to at least receive from the network node an indication of a transmission format to enable the reliability estimate to exceed the threshold reliability.

16. An apparatus, comprising:
at least one processor; and
at least one memory including computer program code, the at least one memory and the computer program code configured to, with the at least one processor, cause the apparatus to at least:
receive, from a first user equipment, a request for a reliability estimate for a communication link between the first user equipment at a first location and a second user equipment at a second location, wherein the request is received before the communication link is at least one of used or established between the first user equipment and the second user equipment;
determine the reliability estimate based on collected and stored transmission information from a plurality of nodes, the plurality of nodes including at least a first node and a second node that are each neighboring nodes of at least one of the first user equipment and the second user equipment, the transmission information including at least packet statistic information indicative of a reliability of the communication link; and
send, to the first user equipment, the reliability estimate for comparison with a threshold reliability before the communication link is at least one of used or established between the first user equipment and the second user equipment.

17. The apparatus of claim 16, wherein the communication link comprises an ultra-reliable communication link.

18. The apparatus of claim 16, wherein the apparatus is further configured to at least request the plurality of nodes to provide reliability information at the first location and/or the second location.

19. The apparatus of claim 18, wherein the apparatus is further configured to at least receive, from the plurality of nodes in response to the requesting, the reliability information measured at the first location and/or the second location, wherein the reliability information further includes at least one timestamp indicating an age of the reliability information.

20. The apparatus of claim 19, wherein the apparatus is further configured to at least determine, based on the received information, the reliability estimate for the communication link at the first location and/or the second location.

* * * * *